United States Patent [19]

Reali

[11] Patent Number: 4,485,470

[45] Date of Patent: Nov. 27, 1984

[54] DATA LINE INTERFACE FOR A TIME-DIVISION MULTIPLEXING (TDM) BUS

[75] Inventor: Peter A. Reali, San Jose, Calif.

[73] Assignee: Rolm Corporation, Santa Clara, Calif.

[21] Appl. No.: 388,746

[22] Filed: Jun. 16, 1982

[51] Int. Cl.³ .............................................. H04J 3/06
[52] U.S. Cl. .................................................... 370/100
[58] Field of Search ..................... 370/100, 24, 32, 85, 370/47, 48

[56] References Cited

U.S. PATENT DOCUMENTS

| | | | |
|---|---|---|---|
| 3,804,982 | 4/1974 | Brown | 370/100 |
| 3,928,727 | 12/1975 | Roche | 370/100 |
| 3,975,712 | 8/1976 | Hepworth et al. | 370/24 |

OTHER PUBLICATIONS

K. Adachi, "High Speed Data Terminal System", Japan Telecom. Review, vol. 17, No. 3, Jul. 1975, pp. 205-214.
L. Smith, "USART-A Universal µP Interface for Serial Data Communications", EDN Mag., vol. 21, No. 16, Sep. 5, 1976, pp. 81-86.
F. Gerard, "High Speed Packet Switching Network to Link Computers", Commun. Int., vol. 7, No. 6, Jun. 1980, pp. 34-36.

*Primary Examiner*—Douglas W. Olms
*Assistant Examiner*—Wellington Chin
*Attorney, Agent, or Firm*—Blakely, Sokoloff, Taylor & Zafman

[57] ABSTRACT

This invention is a data line interface providing a parallel to serial conversion technique for selectively increasing serial data transmission rates. The data line interface receives a 16-bit data word or signal from a TDM bus and transmits it serially to one of a plurality of data terminal interfaces depending on which one is selected. The invention utilizes a double buffer receiver circuit to determine when to speed up the destination transmission clock.

The asynchronous data line interface looks at the value of each of the bits in the data word by sampling the center of each bit. However, during the stop bit, it will not look at the value after sampling the center. Thus, during the time that would have been devoted to the last half of the stop bit, a new start bit may be accepted, allowing the speed up of data to occur.

18 Claims, 6 Drawing Figures

DATA LINE INTERFACE FOR A TIME-DIVISION MULTIPLEXING (TDM) BUS

BACKGROUND OF THE INVENTION

1. Field The Invention

This invention relates to data line interfaces, specifically to an interface providing parallel to serial conversion between a time division multiplexing bus and a data terminal interface.

2. Prior Art

In many modern data terminals, data is transmitted as units of information called bits. The data is transmitted at speeds such as 110, 300, 600, 1200 2400, 4800, 9600 and 19,200 bits per second. In these data terminals, characters are transmitted one at a time, i.e. asynchronously. Thus, these devices are called asynchronous machines. To be received in the proper sequence, each character must carry its own synchronization information.

There are many devices in the prior art that provide the synchronization information in the start-stop bits technique. Such devices transmit a variety of character sizes ranging from 5 to 8 bits of data, plus two to three bits for the start-stop function. The majority of these devices in the United States have a standardized 10-bit character consisting of a start bit (by convention, a logical 0) transmitted before each data word, (which is usually 8 data bits) and a stop bit after the end of the word (by convention, a logical 1). An asynchronous serial data receiver samples the data at a high rate to detect a start bit, calculates the start bit's center point, and activates its own clock at the nominal bit transmission rate to predict the center point of the successive data bits within each bit clock cycle. The bit signals are optimally sampled at their center points where they are most immune to noise interference. The receiver samples for the number of data bits expected in the data word, then samples for the stop bit at which time it turns off its clock bit. The source timing information is easily recovered from the start and stop bits.

It is much simpler to multiplex these devices character by character rather than bit by bit, particularly when the terminal to be multiplexed has different character sizes. For this reason, character interleaved time division multiplexers (hereinafter refer to as "TDM") have been widely adopted for these lower speed applications. Since individual characters may be sent out at a higher rate than received from the transmitter, the multiplexer must be able to buffer at least one character from the transmitter connected to it.

Generally, the data is received in a serial format which is converted to parallel format prior to input into the buffer. The timing information, start and stop bits are generally dropped from the character before buffering and the data is left as untimed data words in the memory buffer. The only information about the source timing is determined by how often the buffer is overwritten by the parallel bus with a new data word. Before the data is received by its destination circuit, it is normally converted back to serial data. If the source transmitter operates continuously at a slightly faster clock rate than the buffer during the parallel to serial conversion, data words will back up in the buffer. The buffer, however large, will eventually overflow and data words will be lost.

The reconversion of parallel to serial data is done by a clock derived from a TDM. This means that the maximum number of characters can be transmitted to the destination is fixed by this clock rate. Thus, there will be no overflow or lost word problems provided that the source of data has a clock rate slower than the clock in the TDM. However, if the clock of the data source is faster, then characters will be coming into the TDM faster than they can be transmitted to the destination.

In many prior art methods, the overflow problem is solved by running the clock for the parallel to serial conversion slightly faster than the nominal bit rate of the source clock. This guarantees that data overflow will not occur. However, these methods succeed in shortening every bit and thus, the system will suffer a loss in the error rate performance regardless of the character rate.

Therefore it is an object of this invention to provide a method and apparatus to regulate the rate of an asynchronous serial data transmission without causing data words to be lost.

It is another object of this invention to provide a method and apparatus to resynchronize a receiver so that it can tolerate a slightly faster than normal data reception.

These and other objects and advantages of the present invention will become apparent to those skilled in the art to which the invention pertains from the following detailed description when read in conjunction with the appended drawings. cl SUMMARY OF THE INVENTION This invention is a data line interface providing a parallel to serial conversion technique for selectively increasing serial data transmission rates. The data line interface receives a 16-bit data word or signal from a TDM bus and transmits it serially to one of a plurality of data terminal interfaces called DTI's depending on which one is selected. The invention utilizes a double buffer receiver circuit to determine when to speed up the destination transmission clock. The system is comprised of a serial receiver receiving data at a source clock rate. The received data comprises a plurality of characters which have a start bit, followed by plurality of data bits and then one or more stop bits. The received data is converted to parallel format for transmission onto a parallel data TDM data bus at a rate controlled by a second clock. The data bus is coupled to a first buffer memory which is used to store data from the bus. The first buffer is coupled to a second buffer memory from which data is read by a bit transmitter to be transmitted through an output latch in serial format to a specified destination. The first and second buffers are coupled to a memory manager which controls when the data is transferred from the first buffer to the second buffer. The asynchronous data line interface looks at the value of each of the bits in the data word by sampling the center of each bit. However, during the stop bit, it will not look at the value after sampling the center. Thus, during the time that would have been devoted to the last half of the stop bit, a new start bit may be accepted, allowing the speed up of data to occur.

DETAILED DESCRIPTION OF THE INVENTION

A data line interface (hereinafter referred to as "DLI"), for providing the interface between a specified data terminal destination (hereinafter referred to as "DTI") and a TDM bus is described. Numerous specific details such as specific circuits, algorithms, diagrams, etc., are disclosed in the following specification to provide a thorough understanding of the invented concepts. It will be obvious to one skilled in the art, however, that these invented concepts may be used in other embodiments. In some instances, well-known circuits have not been described in detail in order not to complicate the specification. The invention will be described in a time division multiplexed telecommunications exchange system. However, the invention can be used for any asynchronous communication in which digital data in parallel form is to be converted into serial form and retimed, including large networks or long distances where timing is lost due to repeated serial to parallel conversions of the data.

Figure 1:
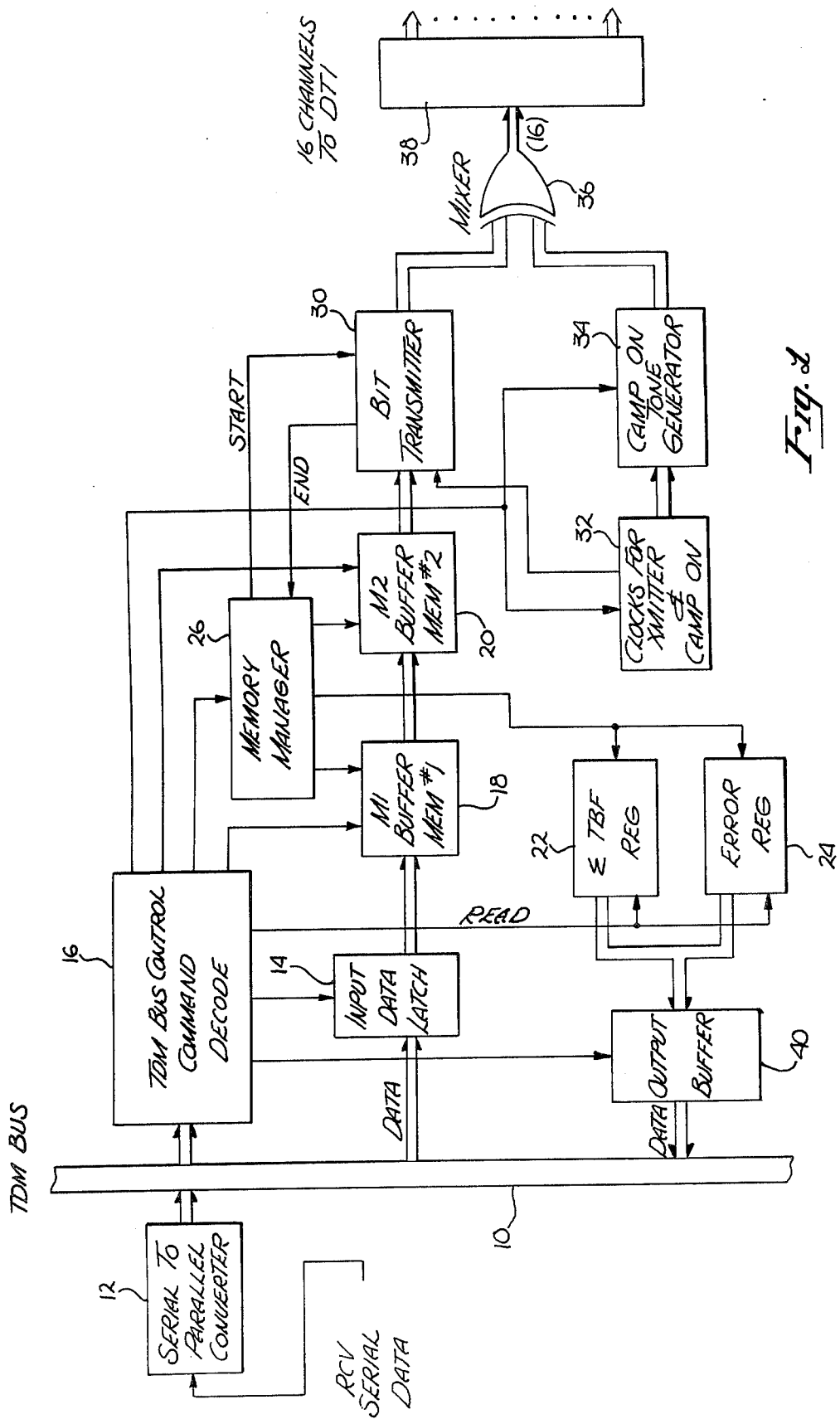
FIG. 1 is a simplified block diagram of the preferred embodiment of the invention.

Referring first to FIG. 1, a block diagram illustrating a typical data line interface in accordance with the present invention is shown. A data bus 10, which in the preferred embodiment is a TDM bus, is connected to a serial to parallel converter 12. The bus 10 receives 16-bit data character in parallel form from the converter 12. The serial to parallel converter 12 converts a serial data stream representing a data character from a data source (not shown) into a parallel data stream. The DLI of the present invention requires that the serial data stream be character-formatted. Each character may be 10 or 11 bits long, including start and stop bits. An 11 bit character should include 2 stop bits. The serial data stream consists of a start bit always a low logic level and eight data bits. Following the eighth bit is either one or two stop bits. The stop bit(s) must always be a high logic level. The next start bit may occur any time after the middle of the last stop bit. The baud rate and number of stop bits must be loaded into the DLI before any transmission can occur.

The data character on the TDM bus 10 may be applied to the input data latch 14 which latches onto the TDM data bus so that data and signal information may be transferred to memories 18 and 20. Upon entering data latch 14, the data is parity checked. In a parity check, a parity bit is appended to the data bits to make the sum of all bits either odd or even. When the bits are added together, the sum will be checked to see whether the number of bits which are a logical one is either odd or even. This number is compared to whether the sum should be odd or even due to the parity bit. If the number is wrong an error will be generated and clocked into error register 24. After the parity check, the data character will be clocked out of the data latch 14 by a state clock derived from the TDM bus control command decoder 16 into double buffer memories 18 and 20. In some applications where parity checking is not required, the data may be directly applied to memory 18 from the TDM bus 10. The channel number for buffers M1 and M2 is determined by the 4-bit output from a Quad 2-input multiplexer which multiplexes the 4-bit write signal and write data channel numbers from the TDM bus with the 4-bit local channel number from the multiplexed state clock. The multiplexed state clock is designed to produce a clock pulse for each of the 16 channels once every cycle at the baud rate which the preferred embodiment is 19.2 Kb, once every two cycles at 9.6 Kbits, half the baud rate, and once every four cycles at a quarter of the baud rate, etc. The circuitry is basically a state machine run from a multiplexed state clock counter. This counter operates from a clocking signal received from the TDM bus.

In the preferred embodiment, memories 18 and 20 are two 16 by 4 static random access memories (RAMS). Thus, the data line interface may store up to two data characters (one 8 bit character in each buffer) such that one character is being stored while the other character is being transmitted. The characters stored in the DTI may be either data or single or a mixture of both. The characters stored in the data terminal interface may be either data characters or signals or a mixture of both. Memory 18 is the first stage of a two-stage process to transform parallel data into serial data. Memory 18 is the "holding" memory between data latch 14 and bit transmitter memory 20. The double buffer storing process is monitored by a transmit buffer full (TBF) register 22 and an error register 24. The TBF summation register 22 indicates when both of the double buffer memories are full and have two signal characters contained therein. It also indicates the state of all 16 channels during a READ cycle. The register 22 notifies the TDM when the buffer memory 18 has space for a least one new character. The TBF register 22 reads out this information to the TDM bus 10 through output buffer 40 when a READ TBF command is received from TDM bus control command decoder 16. The error register 24 contains information regarding data parity errors and overrun errors. For example, the error register 24 will generate a bit indicating that a data character has a parity error when the data is checked for parity. Another error bit will be generated when a new character is received from the TDM bus 10 before memory space is available in either buffer memory to store the new character. The error register 24 will be read by the TDM bus through output buffer 40 when a READ ERROR BUFFER command is received from the decoder 16.

The double buffer memories 18 and 20 and the error registers 22 and 24 are controlled by a memory manager 26. The memory manager 26 is a multiplexed state machine which provides strobes for memories 18 and 20 in order to keep the two memories in synchronization and updates the TBF register 22. It regulates the flow of data information from buffer 18 to buffer 20 and then to a bit transmitter 30. When memory manager 26 detects a new data word it writes it into memory 18. At the end of the word, it will cause the data word from memory 18 to be written into memory 20, thus starting the bit transmitter 30 over on a new word. This regulation is necessary to compensate for the difference in data transfer between the TDM bus 10 and the data terminal interface.

The bit transmitter 30 serializes the output of memory 20 by use of a multiplexed state machine which is run by a clock 32 driven at the baud rate of the particular channel which in the preferred embodiment is the state clock divided by three (DCLK/3). It receives the 8 bit parallel data word from buffer memory 20 and transmits it serially by adding a start and stop bit at the proper baud rate to the head and tail of the data stream. The output of bit transmitter 30 is 16 serial data streams (i.e., 8 from each 8 bit buffer register) which are mixed with camp-on tone information in mixer 36, before being sent for further processing. Camp-on tones are generated in the camp-on generator 34 and are multiplexed with the output data from the bit transmitter 30. In the preferred embodiment, each data bit period is divided into five parts by the bit transmitter's clock 32. The camp-on generator 34 produces a pulse in the middle of each data bit period (which in the preferred embodiment is the third part). The camp-on generator 34 consists of the camp-on control and clock circuits. The control circuit produces 16 enable signals which are selected by 4-bit channel number of the desired camp-on tone. These signals are gated with 16 camp-on clock signals selected by a 4-bit channel number. The resultant signal is then mixed in mixer 36 with the 16 channel data or signal information from the bit transmitter 30. The outputs from mixer 36 (which, in the preferred embodiment is a 16 channel exclusive OR circuit) is sent to the DTI via 16 balanced line drivers 38.

The purpose of camp-on signalling is to be able to put a signal over the top of the data. The camp-on detection generator 34 requires that the camp-on pulse be at least 10 microseconds away from the edge of any data transition.

The DLI compensates for the drift in synchronization by turning off the camp-on tone for brief periods until the DLI detects a new data transition. This guarantees the 10 microsecond margin for detection circuits. The DTI, in turn, integrates the detected camp-on signal to remove the short breaks in the camp-on signal.

When the bit transmitter 30 is depleted of the data signal information, it will send an END signal back to the memory manager 26. To prevent writing over data information already in the buffer memories, the memory manager 26 will allow the full contents of buffer 18 to be transferred to buffer 20 only when the contents of buffer 20 have been transmitted. If this condition is not met and new data is applied to buffer 18 from the TDM bus 10, the overrun detector 26 will write an error into register 24. The overrun detection occurs in the memory manager. When buffer 20 is full, the memory manager 24 sends a START signal to the bit transmitter 30. This START signal allows buffer 20 to transfer information to the bit transmitter 30 which, in turn, serializes the parallel character to be transmitted to the data terminal interface (DTI).

The bit transmitter 30 in the DLI executes an algorithm that can shorten the stop bit by 20% of its normal length. The purpose of this memory is to create an effective speed increase of the DLI's data output by 2% for each bit. This is necessary to compensate for systems that may generate data faster than the nominal baud rate due to differences in clock frequency between the source of data entering the TDM bus 10 and the transmitted data from the DLI. Thus, if data was entering at a continuous rate of 1% higher than the baud rate of the DLI, then 101 characters will be received for each 100 characters transmitted and an overflow will occur. With stop bit shortening, however, the DLI can increase its speed by up to 2% by transferring the extra data character to the bit transmitter 30 before the stop bit is finished. Thus, it can actually transmit this extra character and avoid the overflow condition.

To speed up or slow down the rate at which data is transmitted, a state clock running at a different rate could be used. A faster state clock would work on smaller bit fractions and allow greater flexibility in truncating stop bits to allow a new data word to enter the bit transmitter sooner. For example, with a state clock 20 times faster than the nominal bit rate, the stop bit could be truncated in decrements of 1/20, for overall (8 bit data word) speed decrements of 0.5 percent. The same principle applies, with different proportional speed increases for data words of different length, for example 16 bits. A faster state clock would also allow the multi-channel embodiment to handle a commensurately larger number of channels.

Referring more specifically to the individual blocks of FIG. 1, FIGS. 2-6 are detailed schematics of the individual blocks of FIG. 1.

Figure 2:
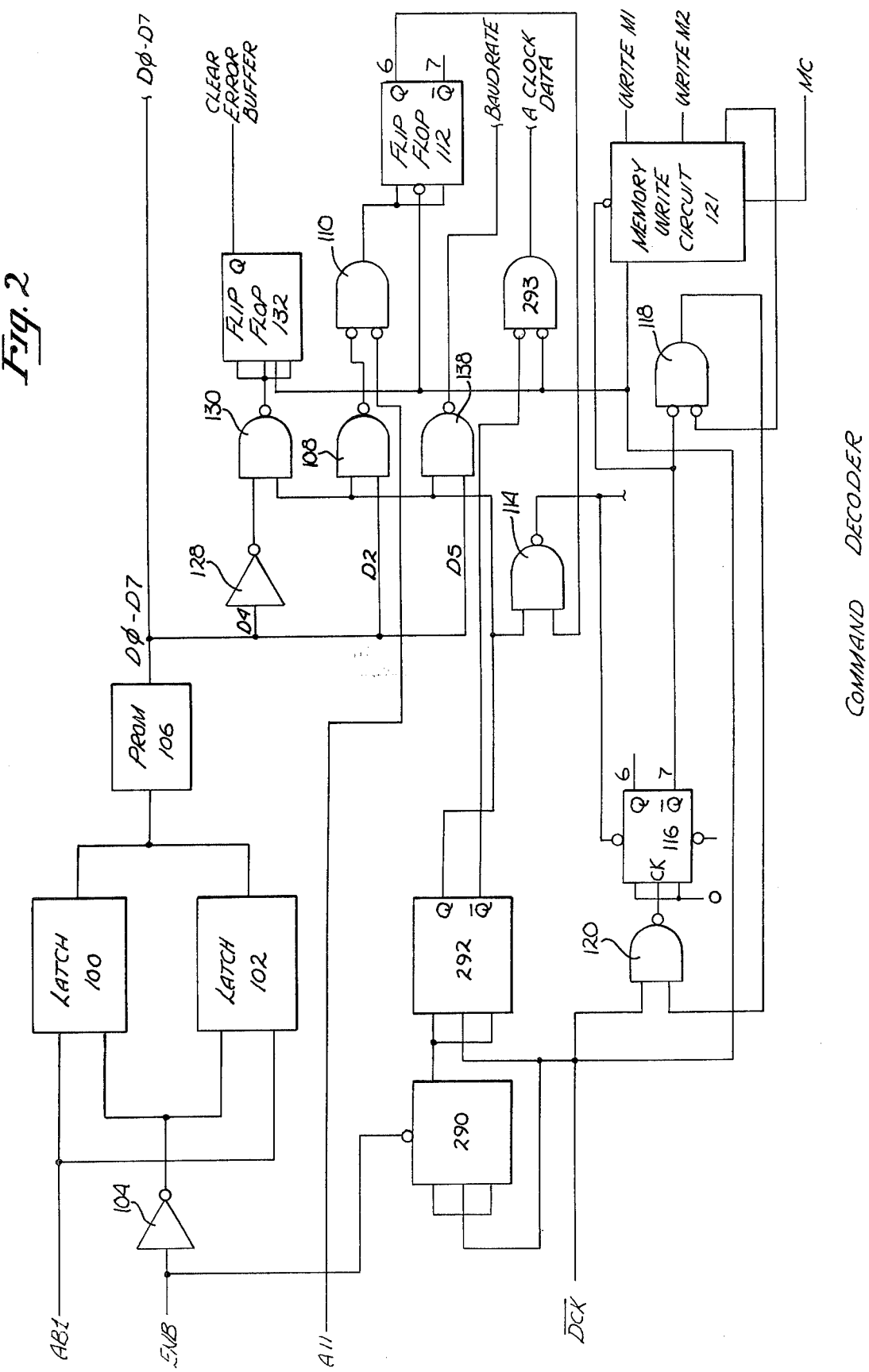
FIG. 2 is a schematic of the TDM Bus Control Command Decoder of FIG. 1.

FIG. 2 is an illustration of the TDM Bus Control Command Decoder 16 of FIG. 1. The 5-bit command from TDM bus 10 is decoded in the TDM bus control command decode logic 16 shown in FIG. 1. An Address Bus (AB1) is latched in latches 100 and 102 by an ENABLE signal received from the TDM bus 10 which causes the output of a Schmitt Trigger 104, to switch from low to high, thus, inverting the ENABLE signal. The outputs of latches 100 and 102 are fed into the TDM decode programmable read only memory ("PROM") 106 as addresses. The PROM 106 produces the following control signals for distribution to the major circuits illustrated in FIGS. 3-6:

D0=1 Change Camp ON Status
D1=1/0 Turn on Camp ON, Turn off Camp ON
D2=1 WRITE data for Serial Transmission
D3=0 Read TBF Summation Register
D4=0 Read Error Register
D5=1 Set Baud Rate
D6=1 Interpret data as a signal
D7=1 Enable output for a READ The D2 output of PROM 106 goes high when data is received from the TDM bus 10. When this output goes high, the NAND gate 108 will be low and the NOR gate 110 will be high if the validity bit A 11 (TV) is active. A 11 is a bit on the data bus 10 of FIG. 1 that is low when a new character is to be written into memory 18 of FIG. 1 it converts a synchronous bus to an asynchronous bus. The high logic level on NOR gate 110 will set the Q output of flip flop 112 high on the next high to low transition of DCLK. This causes NAND gate 114 to preset the Q output of flip flop 116 to a low thus making the output of NOR gate 118 high. This high on the output of NOR gate 118 allows DCLK to pass thru NAND gate 120 to clock the Q output of flip flop 116 back to a high thus creating a single pulse on the output of NAND gate 120 which clears flip flop 116 and prevents another WRITE from occurring. Thus synchronization between the TDM bus and the memory is mediated. NAND gate 120 triggers flip flop 116, NOR gate 118 and Memory Write Circuit 121 which create a memory write pulse (WRITE M1 and WRITE M2) for memories 18 and 20. Memory WRITE Circuit 121 also creates the timing logic used by memory manager to transfer data and clear the new word (NW). The circuit 121 creates the MC pulse which is used to control memory address multiplexer 164 in FIG. 3.

Figure 6:
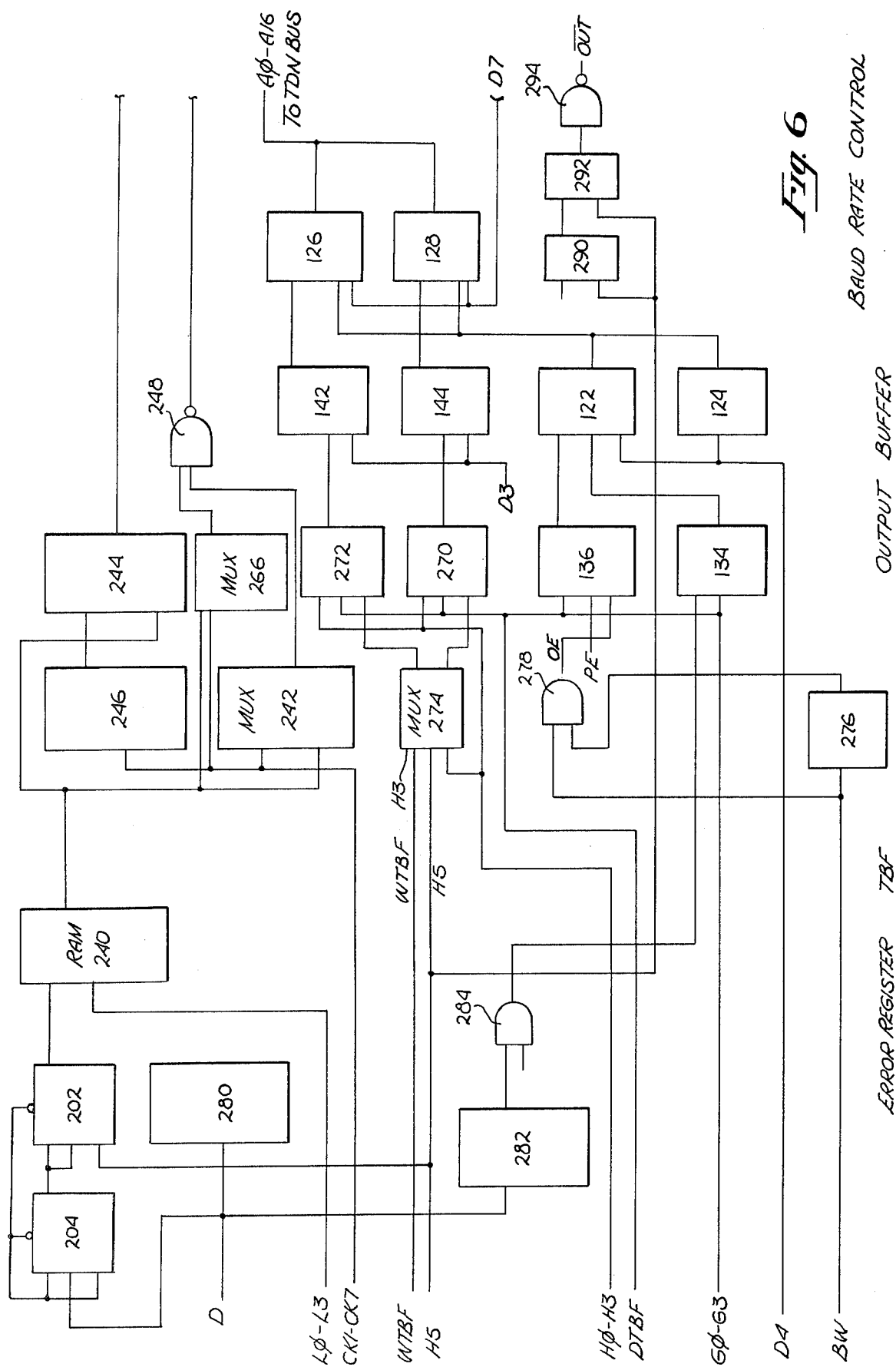
FIG. 6 is a description of the TBF and Error Registers and Output Buffer, and Baud Rate Controller of FIG. 1.

Referring to FIGS. 2 and 6, the D4 output of PROM 106 is the decoder signal for the READ ERROR BUFFER 24. This low level signal comes directly out to the enable pins of buffer 122 and 124 to drive the error information into output buffer tristate drivers 126 and 128. Also, the D7 output of PROM 106 is high at this point to enable the tristate drivers 126 and 128 of output buffer 40 (FIG. 1) to pass the error information onto the TDM bus 10 (FIG. 1). The D4 output of PROM 106 clears the error register a short time after the READ occurs by causing trigger 127 to become a high thus making the output of NAND gate 130 (shown in FIG. 2) low only while a strobe, derived from the ENABLE pulse and DCLK signal, is high. Upon the next DCLK, the output of flip flop 132 (shown in FIG. 2) will become low thereby clearing the flip flops 134 and 136 of error register 24 to clear the error register on a READ command from the TDM bus so that the errors are not reread. The D5 output of PROM 106 is the Set Baud Rate signal. Passing this signal through NAND gate 138 synchronizes it with the enable strobe thus allowing the baud rate control bits to be latched into flip flop 140 shown in FIG. 3 along with the channel number for this setting of the baud rate. This circuit also allows the baud rate on the channel to be changed without disturbing the baud rate on the other 15 channels while they are operational. The D3 output of PROM 106 is the decode signal for a read of the TBF register 22 (of FIG. 1). This pin is directly tied to the enable pins of buffers 142 and 144 thus applying the output onto the tristate drivers 126 and 128 of output buffer for output onto the TDM data bus. The D7 output of PROM 107 again enables the tristate drivers 126 and 128 of the output buffer.

Figure 5:
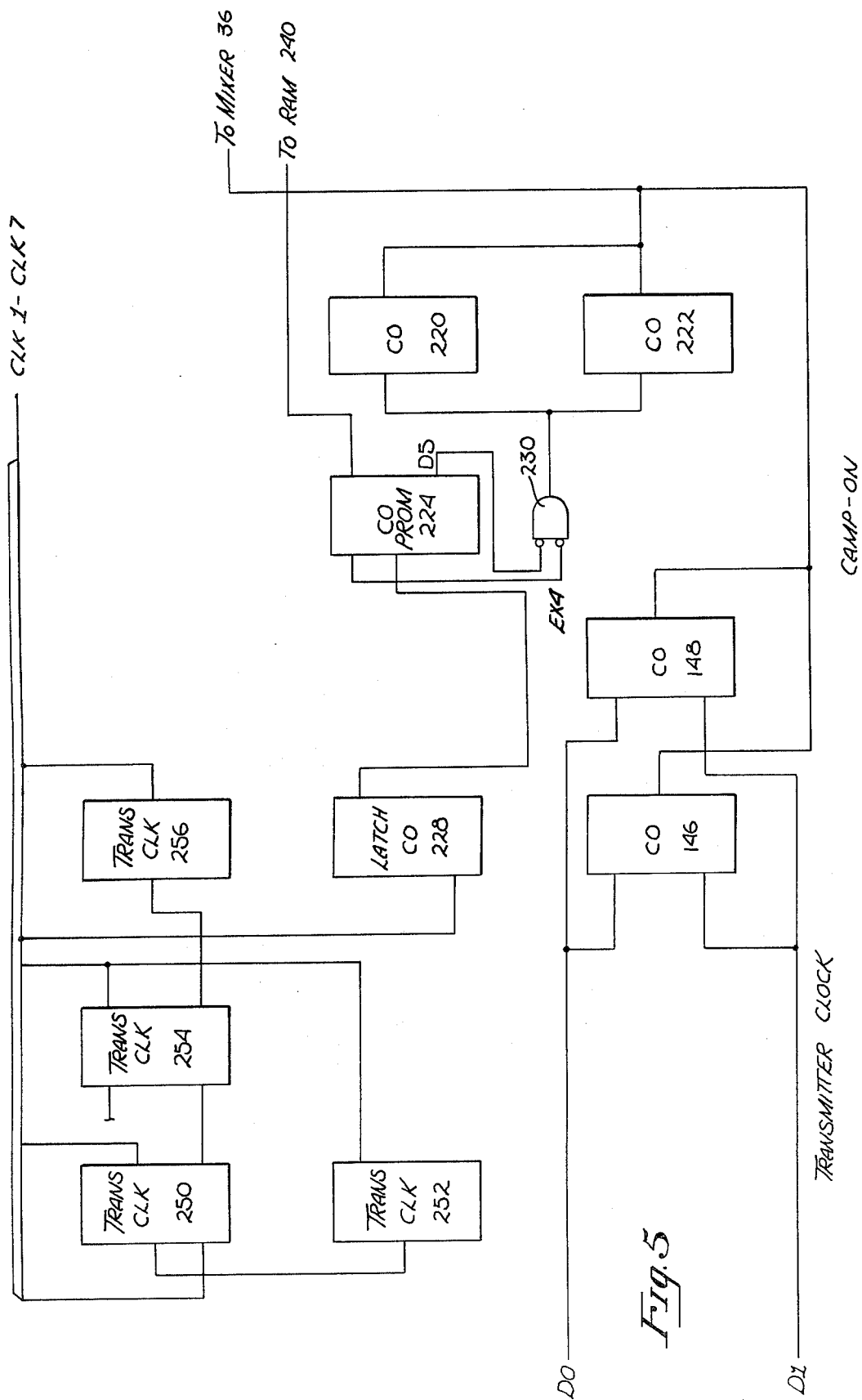
FIG. 5 is a schematic of the Camp-On Generator and Transmitter clock of FIG. 1.

In FIG. 5, the D0 and D1 outputs of PROM 106 control the camp-on status for a particular channel. D0 determines if a change in the status is to occur and D1 either turns on the camp-on (D1-high) or to turn it off (D1-low). D1 is fed directly into the addressable latches 146 and 148, while D0 along with the most significant bit (MSB) of the channel number determines which latch 146 or 148 to enable (upper or lower 8 channels).

Figure 3:
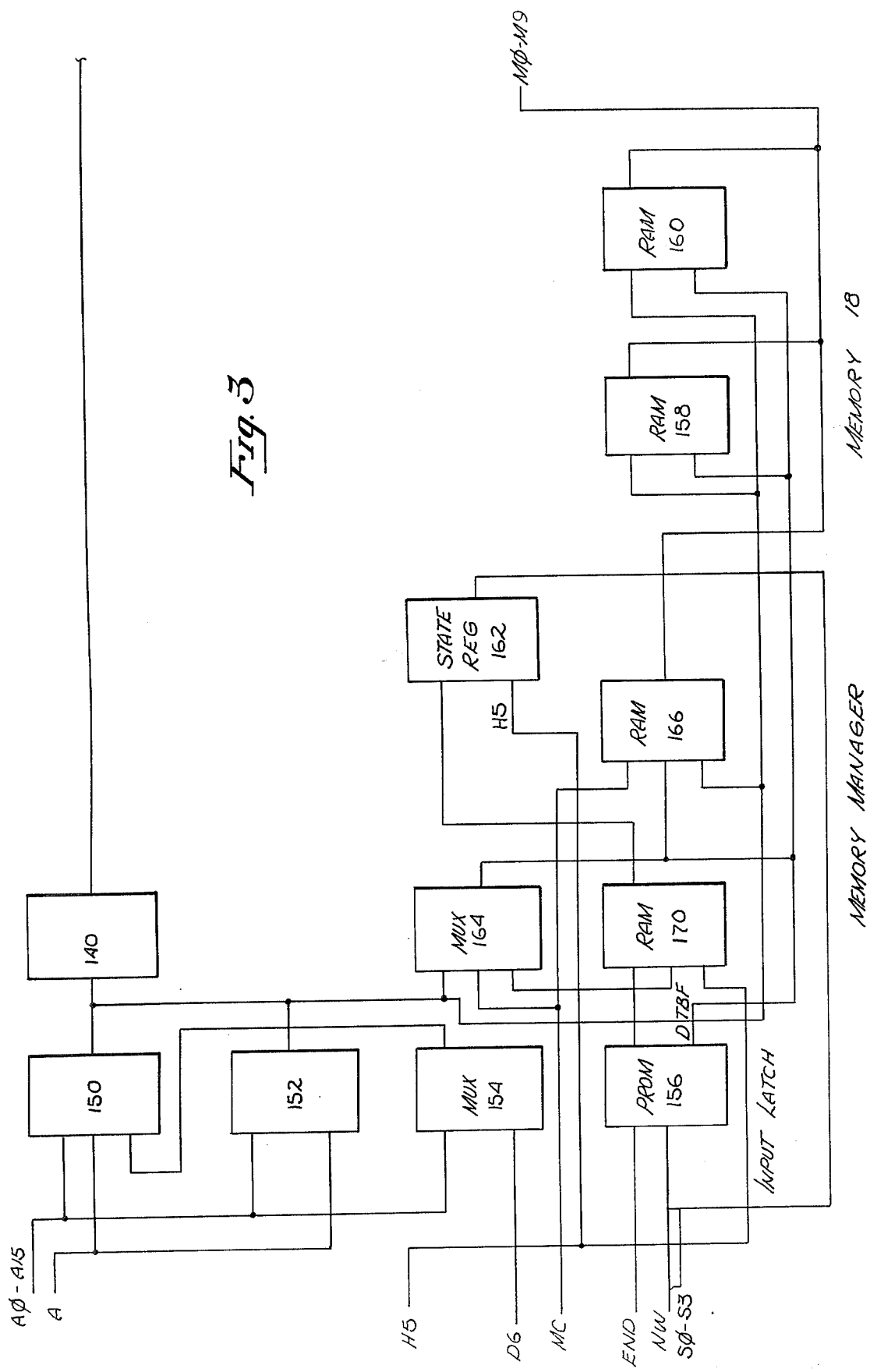
FIG. 3 is a schematic of the Input Data Latch, Memory Manager, and Memory 1 of FIG. 1.

FIG. 3 includes the schematic of the input latch 14 of FIG. 1. The input latch 14 consist of registers 150 and 152 which latch the TDM data bus on the low to high transition of a signal A which is a strobe derived from the ENABLE pulse and DCLK. Flip flop 150 latches the 8 data bits for a character or signal while flip flop 152 latches the channel number and several other bits. The channel number does not directly come from the data bus but is multiplexed in multiplexer 154. The channel number can be from either the TDM data bus 10 in the case of writing a signal or setting the baud rate, or from the address bus in the case of transmitting a data character. The TDM command decode PROM 106 sends a logic level from the D6 output to select the proper input for the input latch.

Referring next to FIG. 3, the detailed schematics of first memory 18, memory manager 26, and second memory 20 are illustrated. Memory 18 is a memory block of two RAMS 158 and 160 which comprise 8 bits by 16 channels. It receives its data from the input latches 150 and 152 when commanded to do so by PROM 156 of the memory manager. RAM 158 contains the upper 4 bits of data while RAM 160 contains the lower 4 bits. Memory 18 gets its address bits (channel numbers) from either the address bus or another part of the TDM bus 10 of FIG. 1 for a WRITE or from the free running channel number which is used in the RAM 170 feeding RAM 162 of the memory manager as a READ. Multiplexer 164 is the selector for the channel number, input signal multiplexer control (MC) being the select line.

The polarity of the MC signal gets written into RAM 166 of memory 18 to produce the new word (NW) signal for any channel number being written into. NW is the value of MC which is one polarity for a TDM bus WRITE access and the opposite polarity for a memory READ access by the memory manager. When the memory manager transfers data M1 into M2 it writes the value of MC back into M1 and "clears" NW until the next TR bit produces a write that produces a NW new word for another memory transfer by the memory manager. The next time that the memory manager 26 works on this particular channel, the new word (NW) conditional input to the PROM 156 will be high. This allows the memory manager to know that new data has arrived to be written into RAM 158 or 160 for transmission.

Figure 4:
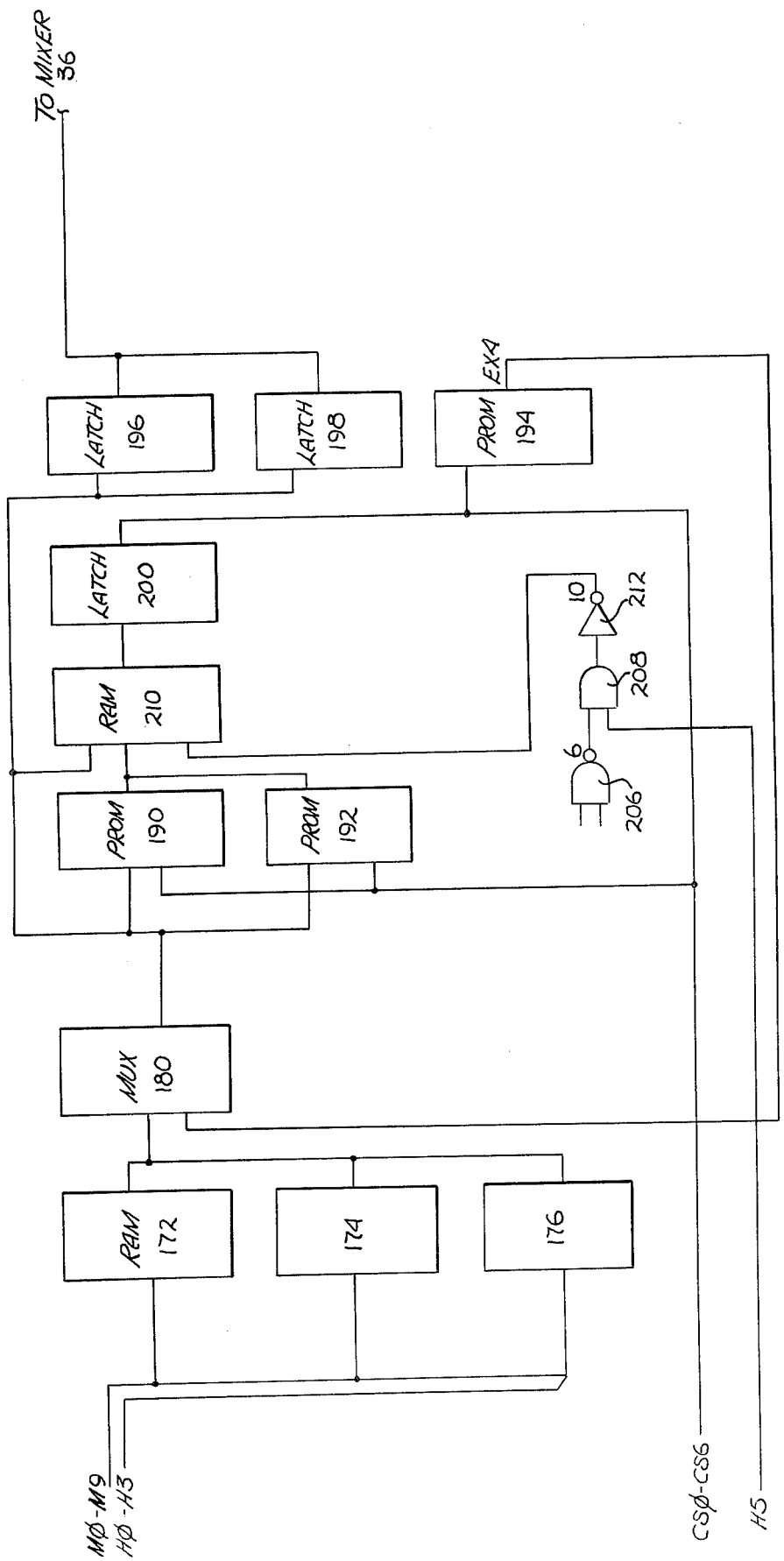
FIG. 4 is a schematic of the Bit Transmitter and Memory 2 of FIG. 1.

Referring next to FIGS. 3 and 4, the memory manager is a multiplexed state machine comprised of PROM 156 containing the firmware, a RAM 170 containing the last state for each of 16 channels and the current state register 162 containing the state of the current channel being accessed. The conditional inputs to the state machine are NW and END. NW tells the memory manager 26 that a new word has arrived from the TDM bus and to process it through memory 20. END comes from the bit transmitter 50 telling the state machine that it is through with the contents of memory 20. The memory manager may then load RAMS 172 and 174 with a new word if it has a word in memory 18.

Memory 20 holds the 8 bit data word and 2 bits of status. RAMS 172 and 174 contain the data while RAM 176 holds the status bits, all addressed by the channel number. Memory 20 receives its WRITE strobe from the memory manager 26 after the memory manager has been conditioned by input signals MC and H5. H5 is the state clock for the memory manager 26 (i.e. it is DCLK/3) which is equal to $5 \times 16 \times 19.2$ KB=5 state cycles for each of 16 channels running at a maximum net rate of 1912 kb—the bit transmitter runs at binary submultiples of this for lower level rates. The bit transmitter uses the outputs of memory RAMS 172 and 174 to serialize the data by selecting the proper bits through the multiplexer 180.

Referring next to FIG. 4, the bit transmitter 30 is a multiplexed state machine comprising PROMS 190, 192 and 194, RAM 210, latches 196, 198 and 200. Besides the regular state outputs, the additional PROM 194 is added to expand the output. These expanded outputs determine which bit is chosen from multiplexer 180 for serial formatting and regulating the camp-on generation. The state clock for this machine is derived from the baud clock shown in FIG. 6 and H5 signal. NAND gate 206 determines if a clock needs to be generated while NOR gate 208 synchronizes it to the H5 signal.

The current state is latched in latch 200 thereby allowing PROM 190 or PROM 192 to determine the next state. The next state is written into RAM 210 and flip flop 204 on the low to high transition of inverter 212. PROM 194 uses this current state information to determine which data bits to look at. The EX4 output of PROM 194 along with the H5 signal will set the addressable latch if the current state address is correct, i.e. the particular serial data needs to be changed. Latch 196 and 198 are the addressable latches used for the serial data on all 16 channels. These outputs are used in the mixers 36 shown in FIG. 1 as the data out inputs. In the mixers the camp-on signals are added in if necessary and the output of the mixers which are exclusive-OR gates (not shown) are fed into a differential 16 line driver 38 (also not shown) which conditions the signal.

Referring next to FIG. 5, the camp-on logic is illustrated in two parts, the first part being the camp-on status. The status which is kept in latches 146 and 148 is whether or not a camp-on signal should be sent for a particular channel. These 8 bit addressable latches 146 and 148 are set or reset by the TDM bus. If the camp-on signal is being set then the bit corresponding to the channel will be high so that D1 is high when D0 is high.

The outputs of these latches are NAND gated with the outputs of another set of addressable latches 220 and 222. Latches 220 and 222 are set and reset by the camp-on state machine's PROM 224. The camp-on state machine is the second part of the camp-on logic. It determines when the camp-on signal should be added to the data stream. The state machine consists of PROM 224, RAM 226, and latch 228. The two conditional inputs to the state machine are EX4 (data transitions edge from the PROM 194 of the bit transmitter 30) and START (start pulse from the memory manager 26). These conditional inputs along with the current state allows the state machine to determine the next state. The D5 output of the PROM 224 is the signal which determines when the camp-on is turned on. NOR gate 230 will go high when both the D5 output and the EX4 output of PROM 194 are low. This will occur at the middle of a bit time and will set the addressable latch high.

The outputs of the two sets of addressable latches 146, 148 and 220, 222 are NAND together. The outputs of the NAND gates (not shown) determines if the camp-on signal should be invoked on a particular channel. When the output of the NAND gate (not shown) is low the camp-on signal is active for that channel. The data stream from the bit transmitter, latches 196 and 198, is actually inverted data. Therefore, when the other input to the exclusive-OR gate, the NAND gate's output, is high the data out is the correct polarity. But when the NAND gate's output is low the inverted data is passed through, thus creating the camp-on signal.

Referring next to FIG. 6, the baud rate clocks are generated by the CK1-CK7 outputs of the transmitter ripple counter in FIG. 5. The ripple counter comprises counters 250, 252, 254, and 256 to generate the baud rate clock. The outputs of the counter comprise the channel numbers and are the baud clocks.

The baud rate control bits are stored in a RAM 240 according to channel number. The output of RAM 240 is used in multiplexer 242 to select the baud rate CK1-CK7 for a particular channel. RAM 240 is connected to multiplexer 244. Multiplexer 244 selects one of the eight clock inputs from RAM 240 while multiplexer 266 selects one of its latched inputs which is a delayed version of the clock. The outputs of these two selectors are gated together in NAND 248.

FIG. 6 illustrates the elements of the ΣTBF register 22, the output buffer 40, and the error register 24. The TBF register consists of two addressable latches 270 and 272 and two line drivers 144 and 142. The latches are addressed by the channel number and are enabled by multiplexer 274 output depending upon the most significant bit (MSB) of the channel number which is the H3 input of multiplexer 274. The memory manager 26 enables the latches through multiplexer 274 by its WTBF (write transmit buffer full). It can either set or reset the particular channel's bit by the DTBF (data transmit buffer data full) output of PROM 156. The TDM command decode logic 16 enables the linedrivers of the output buffer so that the TBF information data is driven by the TBF register 144 and 142 into the TDM bus.

The error register 24 consists of 2 Hex D-type flip-flops 134 and 136 and 2 linedrivers 122 and 124. Flip flop 134 stores the overrun error and the channel number on which it occurred. This overrun error signal comes from latch 276 which latches that fact that a new word has been sent. If it has not been cleared by the time another word comes along the error will be set in flip flop 134 by the clocking of the output of NOR gate 278. The bus parity error PE and overrun error 1 are latched in flip flop 136. Bus parity is checked only when data is received in parity generators 280 and 282. NOR gate 284 blocks the bus parity being generated on the signals sent over the data lines which sets up the data link. Upon a READ of the error register, linedrivers 122 and 124 are enabled onto the TDM bus and the contents of the error register are read. After a READ, the error register is cleared by a clear error buffer signal from the command decoder.

In FIG. 6, the output buffer is a pair of tristate line drivers 126 and 128 coupled to flip flops 290 and 292. These drivers receive an ENABLE signal from the command decode logic 16. Upon a READ of the error register of TBF register, the output buffer must be enabled. NAND 294 will strobe low when the enable pulse ripples through flip flops 290 and 292, and when the D7 output of PROM 106 becomes a high which enables the output for a READ.

The preferred embodiment uses a state clock H5 that runs at 5 times the highest bit rate of 19.2 kb/s or even submultiples of it. This allows the stop bit to be truncated in multiples of 1/5. Omitting the last fifth of the stop bit, i.e., after 4 state cycles in an eight bit data word plus a start bit (a total of ten bits) achieves a $(1/5)(1/10) = 2$ percent overall speed increase. Depending on the trade-off between the benefit of increasing speed versus the detriment of increasing noise, it may be desirable to program PROM 190 and 192 of FIG. 4 to skip after 3 state cycles upon receipt of a new data word, omitting the last 2/5 of the current data word stop bit and proceeding immediately to transmitting the next data word start bit.

Thus, a data line interface has been described in which data, transmitted to a data terminal interface from a TDM bus, is retimed by a stop bit shortening technique. The stop bit is shortened when a new data word arrives at the bit transmitter before the stop bit of the previous data word is half finished. This technique increases the speed of data transmission by as much as one-half of every stop bit, or 5 percent overall for eight bit data words. Therefore, the stop bit shortening technique overcomes the overflow problems normally associated with the variance between the nominal bit rate and the source clock. However, in cases where there is no variance, the stop bits are transmitted for their usual duration so that the data transmission speed is not increased and the noise penalty of the prior art is minimized.

Obviously, while the invention has been disclosed and described with respect to a specific preferred embodiment thereof, it will be understood by those skilled in the art that various changes in form and detail may be made therein without departing from the spirit and scope of the invention.

What is claimed is:

1. A system for converting parallel data to serial format for application to a desired destination channel, comprising bus means for receiving and transferring parallel data, address and command signals, said parallel signals including a stop bit for designating the end of a character;

control means coupled to said bus for receiving the address and command signals from said bus means and generating command signals in response to the signals from said bus means, first memory means for receiving and storing the data from said bus means in response to a command from said control means, second memory means for receiving and storing the data from said first memory means, memory manager means coupled to said first and second memory means for regulating the flow of data from said first memory means to said second memory means in response to a signal from said control means, bit transmitter means coupled to said second memory means for converting and retiming the parallel data received from said second memory means into a serial format, bit sampling means for sampling said stop bit, said bit sampling means reading said stop bit during only a portion of said stop bit and causing said memory manager means to begin to input the start of another character to said bit transmitter, thereby allowing said bit transmitter to read said another character after only a portion of said stop bit, whereby the data from said bus means is converted to serial format and said stop bit is shortened in response to a command from said memory manager means wherein new parallel data can be immediately received from said second memory means such that an overflow of data does not occur.

2. The system of claim 1 further comprising:

a first error detection means for monitoring the first and second memory means to indicate when both of said memories have data contained therein, and also indicating when the first memory means can receive new data;

a second error detecting means coupled to said first and second memory means for indicating an overrun error when new data is received from said bus means when both of said memories have data contained therein, and for providing a means for indicating that the data has a parity error;

and further characterized in that said bit sampling means reads only the first half portion of said stop bit, whereby said first and second error detector means will provide said error information to said bus means in response to a command from said control means.

3. The system of claim 1 further comprising input means coupled to said bus means for receiving said data signals from said bus means and for transferring said data to said first memory means.

4. The system of claim 2 further comprising output means coupled to said first and second error detecting means for driving said error information into said bus means.

5. The system of claim 1 further comprising:

camp-on means for generating camp-on tones which provide a signal to the desired destination channel to notify the channel that said data will be transmitted thereto, and mixer means for mixing said camp-on tones with said data from said bit transmitter means, whereby said mixed data is transmitted to a specific destination channel.

6. The system of claim 1 wherein said control means comprises state clock means for synchronizing said data from said bus means with the output rate of data from said second memory means to said bit transmitter means, whereby said data rate may be slowed down or speeded up in response to said state clock means.

7. The system of claim 1 further comprising transmitter clock means for controlling the rate at which said bit transmitter means receives the data from said second memory means.

8. The system of claim 3 wherein said input means includes a parity detector means for detecting parity errors in said data from said data bus.

9. A data line interface, for transferring data from a source to a specified destination channel in a data line interface, comprising:

bus for receiving and transferring parallel data characters, and address and command signals, each of said data characters being preceded by a start bit and being ended by a stop bit, command decoder means coupled to said bus means for receiving address and command signals from said bus means, and generating command signals in response thereto, input data means coupled to said bus means for receiving said data characters from said bus means, first memory means coupled to said input data means for receiving and storing said parallel data character from said input data means in response to a command from said control means, second memory means coupled to said first memory means for receiving and storing said parallel data character from said memory means, memory manager means coupled to said first and second memory means for regulating the flow of said data character from said first memory means to said second memory means in response to a command from said control means, bit transmitter means for converting and retiming the parallel data character received from said second memory means into a serial format, bit sampling means for sampling said stop bit, said bit sampling means reading said stop bit during only a portion of said stop bit and thereafter causing said memory manager means to move the next data character from said second memory means to said bit transmitter for conversion of said next data character into serial format thereby allowing said bit transmitter to read the next data character after only a portion of said stop bit;

first error detecting means for monitoring the first and second memory means to indicate when both of said memories have a data character contained therein, and also indicating when the first memory means can receive a new data character; and a second error detecting means coupled to said first and second memory means for indicating an overrun error when new data is received from said bus means when both of said memories have data characters stored therein, and for providing a means for indicating that the data has a parity error; and output buffer means coupled to said first and second error detecting means for driving said error information to said bus means;

whereby the parallel data character from said bus means is converted into serial format and said stop bit is shortened in response to a command from said memory manager means wherein new parallel data can be immediately received from said second memory means such that an overflow of data does not occur.

10. The data line interface of claim 9 further comprising:

camp-on means for generating camp-on tones which provide a signal to a desired destination channel to notify said channel that said data will be transmitted thereto, and mixer means for mixing said camp-on tones with said data from said bit transmitter means, whereby said mixed data is transmitted to a specific destination channel.

11. The system of claim 9 wherein said command decoder means comprises a state clock means for synchronizing said data from said bus means with the output rate of data from said second memory means to said bit transmitter means, whereby said data rate may be slowed down or speeded up in response to said state clock means.

12. The system of claim 9 further comprising transmitter clock means for controlling the rate at which said bit transmitter means receives the data from said second memory means.

13. A system for converting parallel data from a source to serial format for transmission to a specific destination channel, comprising:

bus means for receiving and transferring parallel data, address and command signals, each of said data signals forming a character being preceded by a start bit and being ended by a stop bit;

command control decoder means for receiving the command address and signals from said bus means comprising a state clock means for controlling the flow of said data from said bus means, first memory means coupled to said command control decoder means, for receiving and storing parallel data from said bus means in response to a command from said control means, second memory means coupled to said first memory means for receiving and storing the data from said first memory means, memory manager means coupled to said first and second memory means for regulating the flow of data from said first memory means to said second memory means in response to a signal from said control means, and bit transmitter means coupled to receive parallel data from said second memory means comprising first means for generating a start bit in response to a command received from said memory manager means, and second means for converting said parallel data into serial data, said first means generating a stop bit at the end of said serial data, bit sampling means for sampling said stop bit, said bit sampling means reading said stop bit during only a portion of said stop bit and thereafter causing said memory manager means to move the next character from said second memory means to said bit transmitter for conversion of said next character into serial format thereby allowing said bit transmitter to end the next character after only a portion of said stop bit, whereby said stop bit is shortened in response to a command from said memory manager means wherein new parallel data can be immediately received from said second memory means such that an overflow of data does not occur.

14. The system of claim 13 further comprising:

a first error detection means for monitoring the first and second memory means to indicate when both of said memories have data contained therein, and also indicating when the first memory means can receive new data; and a second error detecting means coupled to said first and second memory means for indicating an overrun error when new data is received from said bus means before memory space is available in the first or second memory means to store the new data, and for providing a means for indicating that the data has a parity error;

whereby said first and second error detector means will provide said error information to said bus means in response to a command from said control means.

15. The system of claim 13 further comprising output means coupled to said first and second error detecting means for driving said error information into said bus means.

16. The system of claim 13 further comprising:

camp-on means for generating camp-on tones which provide a signal to a desired destination channel to notify said channel that said data will be transmitted thereto, and mixer means for mixing said camp-on tones with said data from said bit transmitter means, whereby said mixed data is transmitted to the specific destination channel.

17. The system of claim 13 further comprising transmitter clock means for controlling the rate at which said bit transmitter means receives the data from said second memory means.

18. The system of claim 13 wherein said input means includes a parity detector means for detecting parity errors in said data from said data bus.

* * * * *